United States Patent [19]

Saroya

[11] Patent Number: 5,311,003
[45] Date of Patent: May 10, 1994

[54] HAND-OPERATED MAGNETIC STRIPE CARD READER

[75] Inventor: Jagtar S. Saroya, San Pedro, Calif.

[73] Assignee: American Magnetics Corporation, Carson, Calif.

[21] Appl. No.: 894,462

[22] Filed: Jun. 5, 1992

[51] Int. Cl.$^5$ .................. G06K 7/015; G06K 7/08
[52] U.S. Cl. .................. 235/485; 235/440; 235/449
[58] Field of Search ............ 235/485, 484, 451, 440, 235/449

[56] References Cited

U.S. PATENT DOCUMENTS

| | | | |
|---|---|---|---|
| 4,742,213 | 5/1988 | Conant | 235/449 |
| 4,798,322 | 1/1989 | Bernstein | 235/451 |
| 4,835,373 | 5/1989 | Adams et al. | 235/451 |
| 4,876,535 | 10/1989 | Ballmer et al. | 235/451 |
| 5,128,524 | 7/1992 | Anglin et al. | 235/449 |
| 5,198,645 | 3/1993 | Martin et al. | 235/485 |
| 5,206,489 | 4/1993 | Warwick | 235/485 |

FOREIGN PATENT DOCUMENTS

| | | | |
|---|---|---|---|
| 0309201 | 3/1989 | European Pat. Off. | 235/449 |
| 0492358 | 7/1992 | European Pat. Off. | 235/449 |
| 4107544 | 9/1991 | Fed. Rep. of Germany | 235/449 |
| 0125290 | 5/1991 | Japan | 235/485 |

Primary Examiner—Davis L. Willis
Assistant Examiner—Karl Frech
Attorney, Agent, or Firm—Herbert M. Shapiro

[57] ABSTRACT

Azimuth related problems common to hand-inserted, magnetic card readers are avoided by a spring loaded edge guide track which extends along the entire length of travel of the card rather than only in the vicinity of the read head. The invention of both advancing edges of the card within tracks and a pressure plate maintain the advancing card in the plane of travel in a prescribed vertical position necessary for cards with active electronic elements as well.

6 Claims, 3 Drawing Sheets

HAND-OPERATED MAGNETIC STRIPE CARD READER

FIELD OF THE INVENTION

This invention relates to hand-operated magnetic card readers into which a user inserts a card into a slot and then retrieves the card by hand.

BACKGROUND OF THE INVENTION

Insert readers for magnetic stripe-bearing cards are in wide spread commercial use. One on-going problem with such readers is that it is difficult to align the magnetic stripe with the read head, any misalignment resulting in a loss of signal and thus a relatively high level of errors. Even a slight misalignment causes a significant loss of signal, a one percent misalignment resulting in a forty percent loss in signal amplitude.

A variety of attempts have been made to correct such a problem. One such attempt was to attach a bezel to the front of the reader to provide an extended track to align the card bearing the magnetic track. The bezel included a spring which biased one edge of the card against a bearing surface aligned with the read head. Although improvements were realized with the use of such a bezel, the approach was expensive, misalignment occured between the track in the bezel and the track in the reader and errors due to "azimuth" misalignment still occured.

BRIEF DESCRIPTION OF AN ILLUSTRATIVE EMBODIMENT OF THIS INVENTION

It has been found that prior art approaches to ensuring alignment of a magnetic stripe on a card, or other medium, have all been directed at biasing a card against a bearing surface in the vicinity of the magnetic head. Such an approach has been found insufficient to correct azimuth-related problems. Instead, it has been found necessary to provide a spring-biased track along the entire distance traveled by the card for full insertion. The spring-loaded track biased the opposite edge of the card into a matching track, the base of which constitutes a bearing surface which is aligned with the read head. Not only are azimuth related errors eliminated, but a significant cost reduction is achieved.

Further, for cards also housing electronic elements such as is the case with smart cards, capacitive coupling between those elements and mating elements external the card play on important role in operation. Yet any variation in the spacing between the elements in the card and the mating elements external to the card change the capacitance therebetween and thus the operation. Consequently, not only is the card positioning mechanism required to align the magnetic stripe in the plane of the card, it also is required to fix the plane of the card itself in the vertical dimension also.

DETAILED DESCRIPTION OF AN ILLUSTRATIVE EMBODIMENT OF THIS INVENTION

Figure 1:
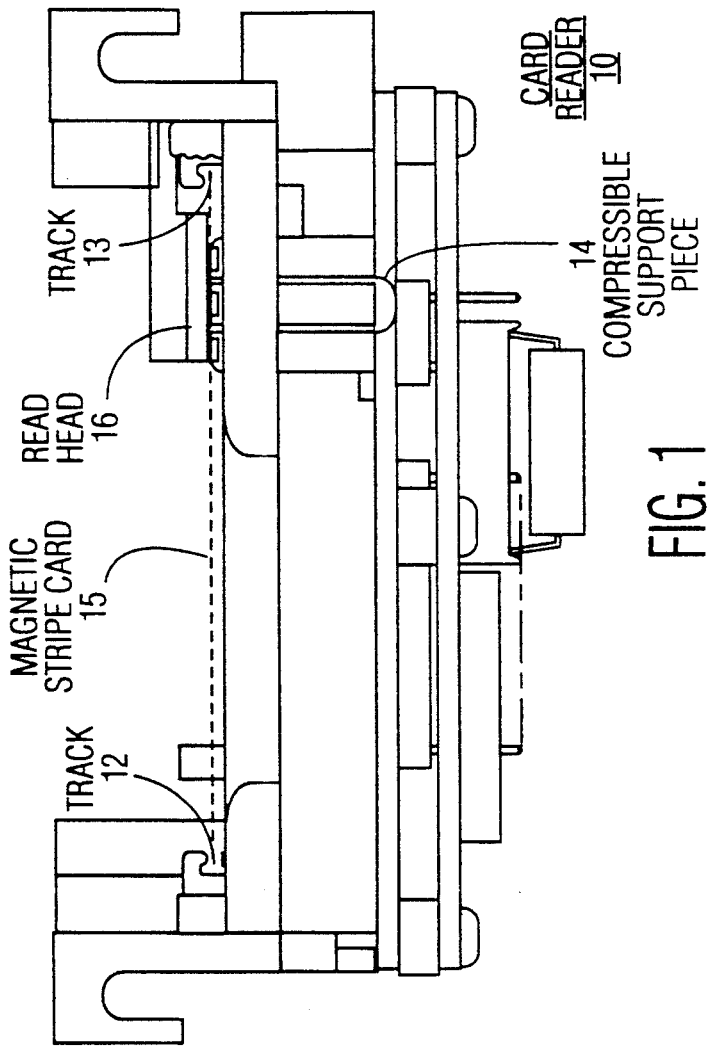
FIG. 1 is an enlarged front view of a card reader in accordance with the principle of this invention.

FIG. 1 shows a front view of a card reader 10 in accordance with the principle of this invention. A card is inserted into the reader by hand between tracks 12 and 13 to the left and right respectively as viewed. The top of a card is positioned such that a magnetic stripe on the card is aligned, with read head 16. The read head is spring loaded by means of support 14 to move downward, as viewed, in response to the pressure of the card. The read head is responsive to the insertion of the card into the reader to read the magnetic data recorded on the stripe in conventional fashion.

Figure 2:
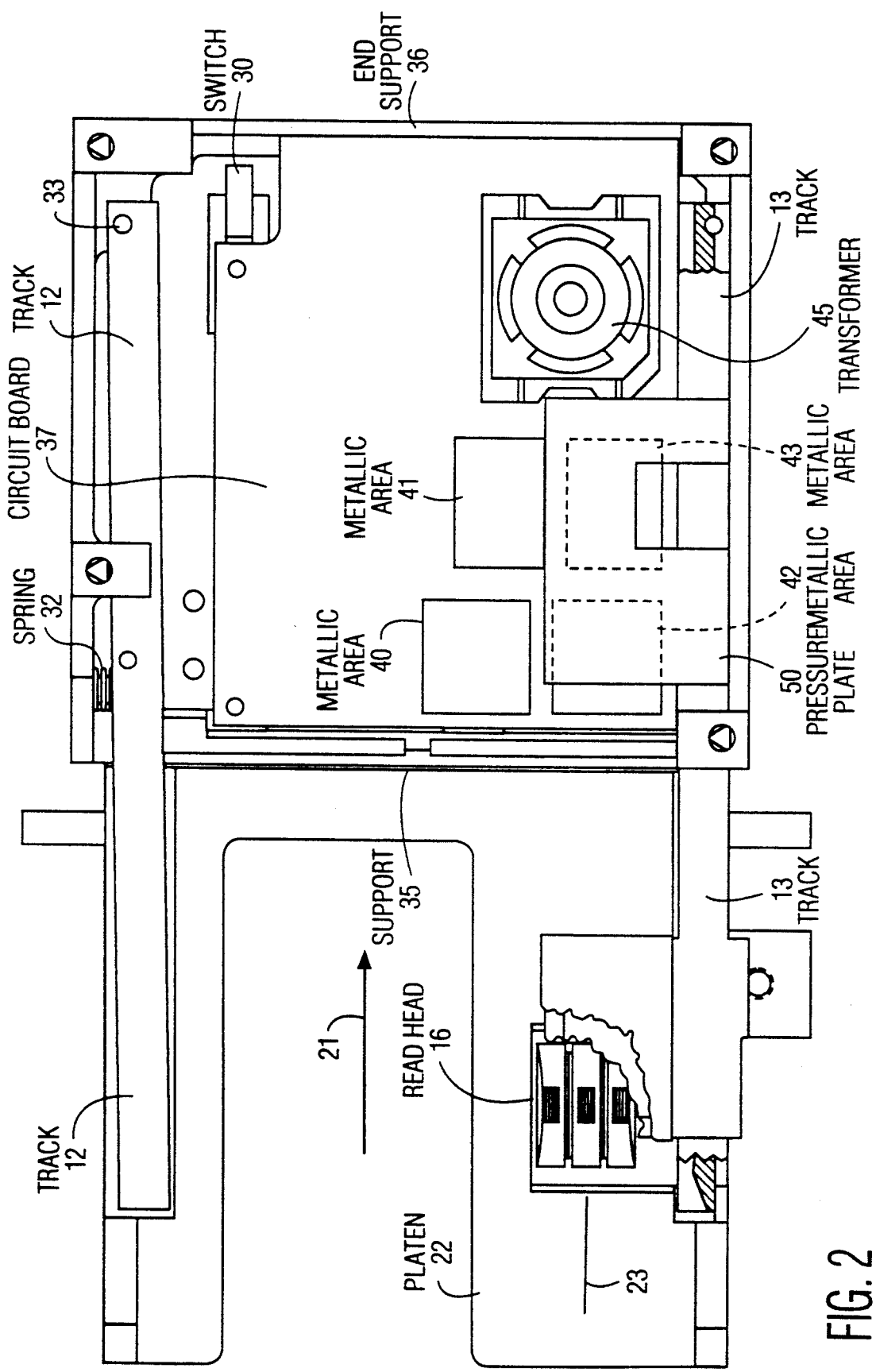
FIG. 2 is a top view of the reader of FIG. 1 showing the travel path of a representative card.

FIG. 2 is a top view of the reader of FIG. 1. A card is inserted from the left, as viewed, and moved to the right as indicated by arrow 21. The card is placed on platen 22 and is pressed against track 13 by spring loaded track 12. The card is maintained in alignment with the axis 23 of read head 16 by the alignment of track 13 with that axis and by maintaining the card against track 13 as a bearing surface by spring loaded track 12.

Figure 3:
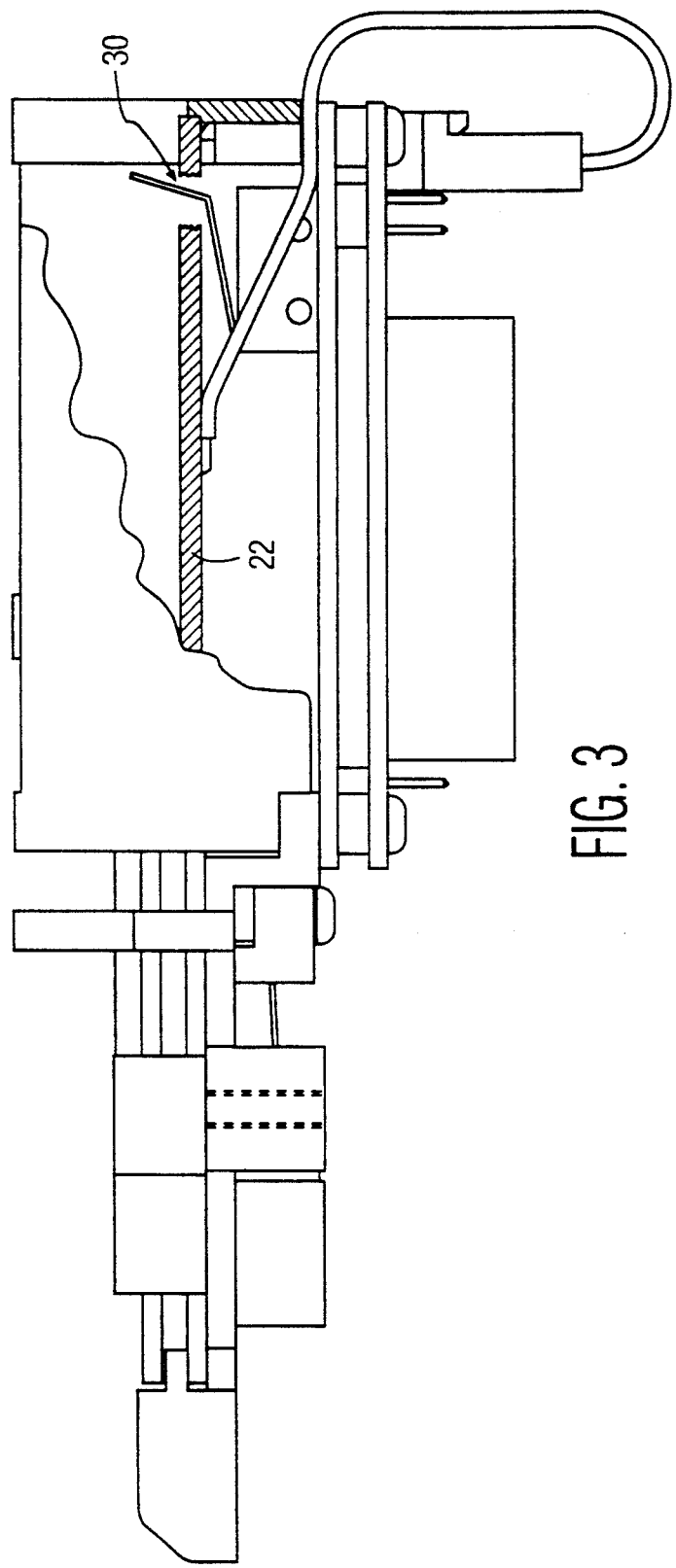
FIG. 3 is a side view of the reader of FIGS. 1 and 2, partially cut away showing the position of a representative card in the vertical demension.

Both tracks 12 and 13 extend the entire length of travel of a card. FIG. 3 shows the tracks extending to the right to actuation point 30. Point 30 is designed as a switch to close when the card is advanced fully in conventional fashion and presses against the switch. As can be seen from FIG. 2, both tracks 12 and 13 extend to the right to guide a card fully to the position at which point 30 is reached. Track 12, moveover is sprung by spring 32 of FIG. 2 to provide a force to press a card against track 13 over the entire distance. Track 12 pivots about pivot point 33 in FIG. 2 which is positioned in alignment with switch 30 to ensure a proper biasing of the card over the entire length of travel.

The reader can be seen to have an open configuration to allow foreign objects to exit the reader before causing damage to the reader. The platen ends at support 35 shown in FIG. 2. To the right of that support, the reader is essentially of an open configuration, having only side supports for tracks 12 and 13 and an end support 36 to maintain the side supports in a rigid configuration.

For embodiments where the magnetic stripe is on a card which includes active electronic elements, such as occurs in a smart card, the vertical position of the card also becomes important. For embodiments of the smart card variety, the area to the right, of support 35, in FIG. 2, is occupied by a circuit board 37 which includes several metallic areas 40, 41, 42, and 43 each of which forms one half of a capacitor. Also, one half of a transformer 45 is defined in the reader. A smart card includes the mating half capacitor an half transformer.

Of course, any smart card inserted into the reader is required not only to align with read head 16 as described above, but also is required to be positioned, when fully inserted, so that the mating capacitor and transformer elements are not askew (azimuth variant) and the separation between the mating elements meet design specifications. Track 13 and spring biased track 12 ensure that azimuth variants do not occur. Pressure plate 50 of FIG. 2 ensures that an inserted card is maintained in a vertical plane to maintain those separations within design specifications.

The invention relates to a mechanical arrangement for ensuring proper positioning and orientation of a magnetic stripe medium and to the avoidance of loss of signal due to improper positioning and alignment during the travel of the medium. The invention is not directed at the electronic implimentation for capturing such signals. The electronics and the operation thereof with magnetic stripe media and smart cards are well understood in the art and not discussed herein.

I claim:

1. A reader for a medium bearing a magnetic stripe, said reader including a platen for receiving said medium and first and second guide tracks for receiving first and second advancing edges of said medium, said reader also including a magnetic read head having an axis aligned with said magnetic stripe for reading information on said stripe as it advances in said reader between said tracks, said first and second tracks extending along the entire length of travel of said medium thus defining a plane of travel said first track being in fixed alignment with said axis, said second track being spring loaded for urging said medium against said first track and thus maintaining said stripe in alignment with said axis for avoiding azimuth errors.

2. A reader as set forth in claim 1 wherein said first and second tracks define a plane in which said medium travels, said plane being parallel to the plane of said head.

3. A reader as set forth in claim 2 wherein said head is spring loaded for accepting a magnetic stripe card.

4. A reader as set forth in claim 2 also including means for defining electronic element halves for mating with a card including mating half elements, said means being disposed in alignment with said platen and being positioned for mating said half elements with the mating half elements in said card when said card is fully inserted.

5. A reader as set forth in claim 4 also including a pressure plate for maintaining said card in a position to maintain the spacing between mating element halves at a prescribed distance.

6. A reader as set forth in claim 3 also including a switch responsive to full insertion of a medium into said reader for signalling the presence of a medium at the full insertion position, said second track pivoting at a pivot point aligned with said switch.

* * * * *